(12) United States Patent
Leemon

(10) Patent No.: US 6,494,157 B1
(45) Date of Patent: Dec. 17, 2002

(54) FLEXIBLE, BUOYANT, WEATHER RESISTANT POLYETHYLENE FOAM BOAT BUMPER/FENDER

(76) Inventor: Arnold Anton Leemon, 2660 Mandale Ter., West Bloomfield, MI (US) 48324

( * ) Notice: Subject to any disclaimer, the term of this patent is extended or adjusted under 35 U.S.C. 154(b) by 0 days.

(21) Appl. No.: 09/897,274

(22) Filed: Jul. 3, 2001

(51) Int. Cl.[7] .............................................. B63B 59/02
(52) U.S. Cl. .................................................... 114/219
(58) Field of Search ............................... 114/219, 220, 114/218

(56) References Cited

U.S. PATENT DOCUMENTS

| | | | | |
|---|---|---|---|---|
| 1,877,793 A | * | 9/1932 | Beynon ........................ | 114/219 |
| 2,197,839 A | * | 4/1940 | Roberts et al. ............... | 114/219 |
| 2,680,859 A | * | 6/1954 | Hultberg ...................... | 114/219 |
| 3,455,269 A | * | 7/1969 | Dean ........................... | 114/219 |
| 3,528,383 A | * | 9/1970 | Fetters ......................... | 114/220 |
| 3,540,403 A | * | 11/1970 | Russell ........................ | 114/219 |
| 3,964,422 A | * | 6/1976 | Boyd ........................... | 114/219 |
| 4,136,632 A | * | 1/1979 | Day et al. ..................... | 114/220 |
| 4,273,065 A | * | 6/1981 | Lindsay et al. ............... | 114/219 |
| 4,875,427 A | * | 10/1989 | Harris, Jr. .................... | 114/219 |
| 4,893,576 A | * | 1/1990 | Day et al. ..................... | 114/219 |
| 5,016,554 A | * | 5/1991 | Harris et al. ................. | 114/219 |
| 5,355,822 A | * | 10/1994 | Lemke ......................... | 114/219 |
| 6,196,150 B1 | * | 3/2001 | Fondacaro ................... | 114/219 |

* cited by examiner

Primary Examiner—S. Joseph Morano
Assistant Examiner—Lars A. Olson
(74) Attorney, Agent, or Firm—Bill C Panagos

(57) ABSTRACT

A boat bumper/fender, comprising a resilient, flexible, weather resistant, body having opposing first end and a second ends, said body composed of a closed cell foam material and having length, width and height, said body being of greater length than width; said body having an internal passage extending substantially the length of said body and terminating at said first and second ends; bushing means adapted to be inserted into said first and second end of said body; anchoring means extending through said body in said passage and extending beyond the ends of said body; said anchoring means further equipped with stop means to cooperatively interact with said bushing to limit movement of the body along said anchoring means.

14 Claims, 1 Drawing Sheet

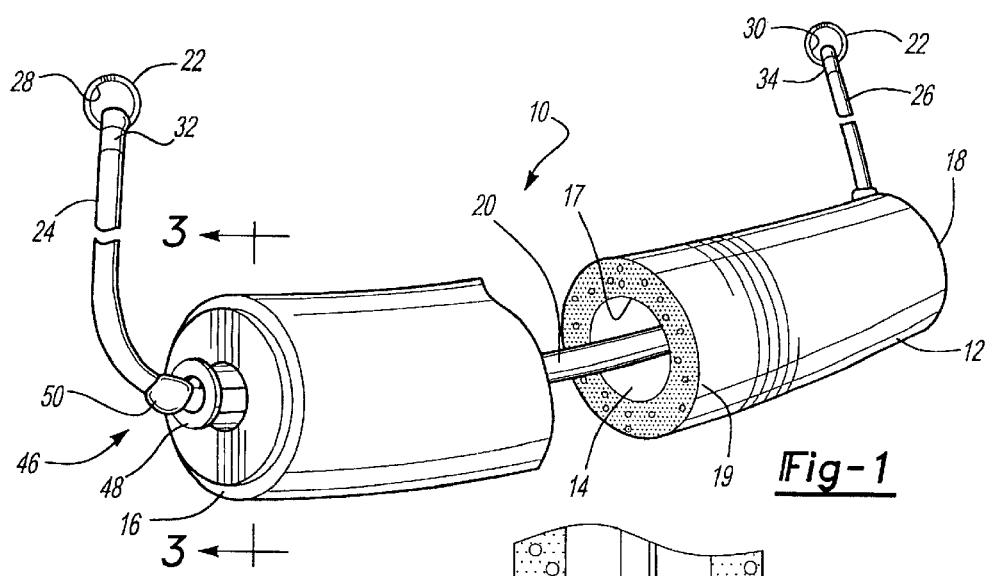
Fig-1
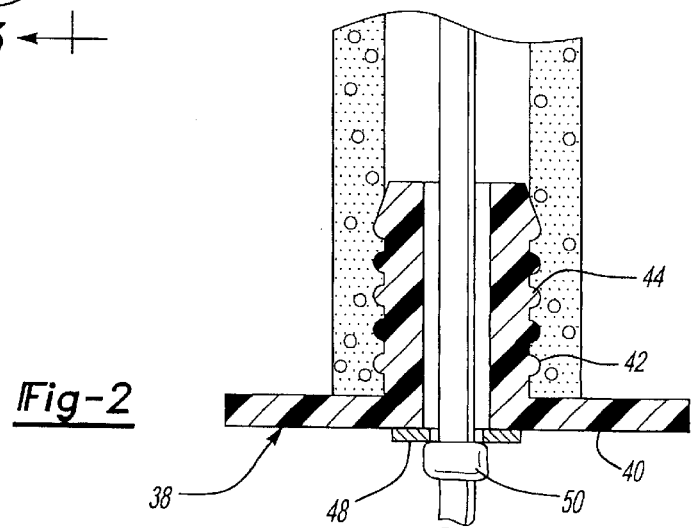
Fig-2
Fig-3
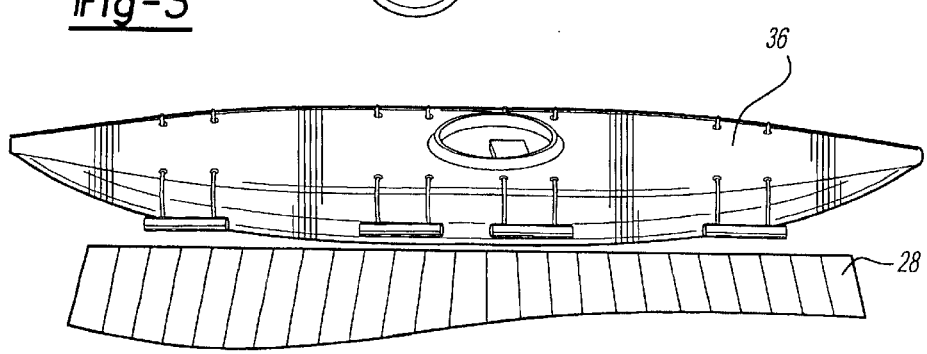

FLEXIBLE, BUOYANT, WEATHER RESISTANT POLYETHYLENE FOAM BOAT BUMPER/FENDER

BACKGROUND OF THE INVENTION

1. Field of the Invention

The present invention relates to a flexible, weather resistant, buoyant foam boat bumper/fender that is inexpensive, and easy to use.

The present invention further relates to a flexible, weather resistant, buoyant polyethylene foam boat bumper/fender that is inexpensive and easy to use.

The present invention further relates to a durable weather resistant inexpensive boat bumper/fender that does not require captured air within an inner chamber for its ability to protect boats or other articles from damage due to incidental contact with stationary or other members.

2. Description of the Related Art

Green, U.S. Pat. No. 4,584,958 discloses a bumper for protecting the hull of a boat comprising a plurality of one-piece bumper bodies of resilient deformable material positioned end-to-end. Each of these bodies has a curved portion with a periphery forming a partial cylinder extending through an arc exceeding 180 degrees and a socket portion having a semi-cylindrical cavity with a radius equal to the radius of the partial cylinder. Preferably the curved periphery of the partial cylinder extends through 270 degrees so that the bumper can bend around a 90 degree corner of the boat. Each body has a passage extending lengthwise through both the curved portion and the socket portion. A rope passes through all the passages to connect the bodies together and form a complete bumper. The bodies are positioned on the rope with the curved portion positioned in the socket portion of the adjoining bumper body. Preferably a rope cleat is used to fix the bumper bodies against displacement relative to the rope. The bumper body can be hollow or can be filled with a low density polyethylene.

Green differs from the claimed invention in that Green requires a hollow body that may be filled with low density polyethylene foam. The present invention is directed to a boat bumper that is formed of a UV resistant, marine resistant foam material. On material useful in the claimed invention is polyethylene foam. However the foam of the claimed invention is a closed cell polyethylene foam material. There is no showing the low density polyethylene foam of Green may be the dense, closed cell material useful in the claimed invention. Further, there is no teaching of using the polyethylene material of Green as the body of the boat bumper. Accordingly, Green differs from the claimed invention.

Stevens, U.S. Pat. No. 5,018,471 discloses a resilient marine fender for protecting a boat from damage resulting from impact against a boat dock, piling or other marine structure includes a fender body having an elongate bumper portion on one side of sufficient resiliency to cushion normal impact of the boat and mounting surface on the opposite side thereof of sufficiently frictional character with respect to the piling for generally non-slipping engagement therewith. The bumpers are formed of a material suitably resilient to deform when, for example, a boat or other marine vessel engages against the portions such as the result of marine wave action, in order to absorb the impact forces of the vessel and prevent direct contact between an elongate piling and the boat which could scratch, mar or even structurally damage the vessel. Preferably, each elongate resilient portion is a solid body of a high-density resilient plastic foam, formed for example by molding. There is no showing in Steven of using a high density, closed cell deformable resilient foam material, such as polypropylene, as the bumper fender.

Reinhardt, U.S. Pat. No. 6,095,074 discloses a bumper for a boat dock is provided which is durable, resilient and visible at night. The bumper is constructed of an expanded polymer such as polyethylene or polypropylene. The bumper is preferably made of translucent polyethylene foam with a density of between 2 and 4 pounds per cubic foot. When polyethylene foam is subjected to impact, it absorbs the force of the impact and returns to its original shape. The present invention includes a light for illumination of the bumper itself or illumination of an area immediately adjacent the bumper. A slot in the bumper is provided for accepting the illumination source. If the bumper is translucent, as with white polyethylene foam, the illumination source may be inserted into the back of the bumper such that light is emitted through the front of the bumper. If the bumper is opaque, the illumination source may be inserted into a slot in the bottom of the bumper so that the light is emitted from the bottom of the bumper. The illumination source may be controlled by a radio frequency switch or by a timer. There is no showing of using the foam material of the claimed invention in combination with bushings and an attachment means to make a simple yet effective boat bumper/fender.

SUMMARY OF THE INVENTION

The present invention is directed to a boat bumper/fender comprising a resilient, flexible weather resistant, buoyant body equipped with opposing first end and second end. The body has length, width and height, and is of greater length than width. The body has an internal passage extending substantially the entire length of said body and terminating at the first and second ends. Bushing means at either end are adapted to be inserted into said first and second end of said body, and anchoring means extend through the body in said passage and beyond the ends of said body. The anchoring means is further equipped with stop means to cooperatively interact with said bushing to limit movement of the body along said anchoring means. The anchoring means terminate at each end with a securing means to facilitate fastening the anchoring means to a mooring, such as a dock.

Preferably, the boat bumper/fender is tubular and the anchoring means is a length of marine rope threaded through said passage. The stop means is a plate secured to said anchoring means and of sufficient size to interact with said bushing and prevent movement of the body along said anchoring means. The bushing further comprises means to secure each said bushing in said ends and resist removal.

Most preferably, the boat bumper/fender body is comprised of a polyethylene foam material having the formula:

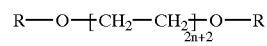

$$R-O-[CH_2-CH_2]_{2n+2}-O-R$$

wherein R is an alkyl, and n is a number such that the molecular weight of the composition is in the range of about 11,000 to about 196,000.

This material is commercially available from Industrial Thermo Polymers, Limited, located Brampton, Ontario, Canada, under the trademark Tundra Foam Logs. This material is resistant to UV light, as well as other weather conditions and is buoyant, having previously been used as flotation devices for aquatic use. Typically, this material presents a closed cell structure that is flexible and deformable without damage to its structure. Other similar materials that may be used are closed cell foams of polypropylene, polybutylene, or other dense closed cell foam materials.

The anchoring means is a marine resistant rope and the stop means is comprised of a knot in said rope to cooperatively engage a washer threaded onto the rope between the knot and each bushing to prevent movement of the body along the anchoring means.

BRIEF DESCRIPTION OF THE DRAWINGS

FIG. 1 is a side cutaway view of the boat bumper/fender, showing the internal passage.

FIG. 2 is a side view of one example of a bushing suitable for use with the boat bumper/fender of the instant invention taken along line 3—3 of FIG. 1.

FIG. 3 is a plan view of the boat bumper/fender of the instant invention in use at a marine dock.

DETAILED DESCRIPTION OF A PREFERRED EMBODIMENT

Turning now to the drawings, wherein like numerals refer to like structures, and particularly to FIG. 1, there is shown therein a cut-away side view of the boat bumper/fender, detailing its internal structure and overall configuration. Boat Bumper/fender 10 is comprised of a body 12, having a length "l", a width "w", and a height "h". Most preferably, the boat bumper/fender body is comprised of a polyethylene foam material having the formula:

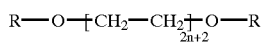

wherein R is an alkyl, and
n is a number such that the molecular weight of the composition is in the range of about 11,000 to about 196,000. This material is commercially available from Industrial Thermo Polymers, Limited, located Brampton, Ontario, Canada, under the trademark Tundra Foam Logs. This material is resistant to UV light, as well as other weather conditions and is buoyant, having previously been used as flotation devices for aquatic use. Typically, this material presents a closed cell structure that is flexible and resiliently deformable without damage to its structure. Other similar materials that may be used are closed cell foams of polypropylene, polybutylene, or other any other dense closed cell foam material. In the embodiment depicted in FIG. 1, the length is greater than the width, such that the body has a tubular profile. Those skilled in the art will immediately recognize that the body may have any configuration, and be of any dimensional proportions, and the configuration discussed herein is merely for purposes of example, and not in any way limiting as to the shape that the boat bumper/fender of the present application may assume.

Boat bumper/fender body 12 has a passage 14 that extends substantially the entire length of the body and terminates at opposing first and second ends 16 and 18, respectively. Thus, it is apparent that there is an inner diameter wall 17 extending along the length of the passage, and an outer diameter wall 19, extending along the exterior of boat bumper/fender body. Anchoring means 20, depicted as a length of marine resistant rope, is threaded along the length of the body through passage 14, and extends beyond the first and send ends of the body and terminates in securing means 22 at each end 24 and 26 of the anchoring means to secure the anchoring means to a to a boat 36 to prevent damage resulting from contact with a dock 28, as seen in FIG. 3. Other suitable anchoring means may be cables or chains or any other apparatus suitable for threading through the passage in the body.

Securing means are depicted as loops 28 and 30, secured in place by crimping means 32 and 34. It should be apparent to those skilled in the art that many different means may be employed to created securing means such as snap fittings, knots, loops formed of weaving or braiding, or crimping or tying, or chain links in the case of a chain as the anchoring means. Thus, the securing means is of such construction as to facilitate the fastening of the anchoring means to a boat 36, as seen in FIG. 3. It is understood that one could secure the boat fender/bumper to the dock to the same purpose.

The bumper/fender body is further equipped at each end with a bushing 38, as seen in FIG. 2. Each bushing is of a conventional configuration, having a head 40, and a body 42, adapted to be inserted into the passage of the boat bumper/fender body. The bushing head is preferably of sufficient diameter as to be at least the same size as the dimension of the body ends, so that it can act as a protector to the boat bumper/fender body and prevent the anchoring means from damaging the bumper/fender body during use. The bushing body may be equipped with retention rings 44 to cooperatively engage the inner diameter wall of the passage to hold the bushing in place. Other means for retention are apparent to those skilled in the art, and are included within the scope of this invention.

Returning to FIG. 1, stop means 46 include means to cooperatively interact with said bushings to prevent lengthwise movement of the bumper/fender body along the anchoring means. Stop means may be comprised of a washer 48, threaded onto said anchoring means, and interposed between the bushing head and a stop 50, shown as a knot or similar obstruction along the length of the attachment means. In this manner, the body is suspended on the attachment means between the two obstructions, and the washer acts as a stop between the obstruction and the bushing head to limit movement of the body lengthwise along the attachment means.

While one preferred embodiment has been described, those skilled in the art will recognize that many variations and modifications are possible without departing from the scope and sprit of the invention as set forth in appended claims.

I claim:

1. A boat bumper/fender, comprising: a resilient, flexible weather resistant, and UV light resistant body of a dense closed cell foam material, said body having opposing first and second ends, said body having length, width and height, said body being of greater length than width; said body having an internal passage extending substantially the entire length of said body and terminating at said first and second ends; bushing means adapted to be inserted into said first and second end of said body; anchoring means extending through said body in said passage and extending beyond the ends of said body; said anchoring means having opposing ends and further equipped with stop means to cooperatively interact with said bushing to limit movement of the body length wise along said anchoring means.

2. The boat bumper/fender of claim 1, wherein said body is tubular.

3. The boat bumper/fender of claim 1, wherein said anchoring means is a length of marine resistant rope threaded through said passage.

4. The boat bumper/fender of claim 1, wherein said anchoring means is a cable threaded through said passage.

5. The boat bumper/fender of claim 1, wherein said stop means is a plate secured to said anchoring means and of sufficient size to interact with said bushing and prevent movement of the body along said anchoring means.

6. The boat bumper/fender of claim 1, wherein said bushing further comprises means to secure each said bushing in said ends and resist removal.

7. The boat bumper/fender of claim 1, wherein said body is comprised of a polyethylene foam material having the formula:

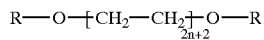

wherein R is an alkyl, and n is a number such that the molecular weight of the composition is in the range of about 11000 to about 196,000.

8. The boat bumper/fender of claim 1, wherein said anchoring means is a marine resistant rope.

9. The boat bumper/fender of claim 7, wherein said stop means is comprised of a knot in said rope to cooperatively engage a washer between said knot and said bushing to prevent movement of the body along the anchoring means.

10. The boat bumper/fender of claim 1, further including securing means on said anchoring means to facilitate fastening said boat bumper/fender to a mooring.

11. The boat bumper/fender of claim 10, wherein said securing means is a snap fit clasp secured to each end of said anchoring means.

12. The boat bumper/fender of claim 10, wherein said securing means is a loop formed in the ends of said anchoring means.

13. The boat bumper/fender of claim 1, wherein said body is made of closed cell polypropylene foam.

14. The boat bumper/fender of claim 1, wherein said body is made of closed cell polybutylene foam.

* * * * *